2,780,610

COMPOSITIONS COMPRISING A POLYMER OF ACRYLAMIDE AND ETHYLENE GLYCOL

William A. Barber, Stamford, and Henry Z. Friedlander, Greenwich, Conn., assignors to American Cyanamid Company, New York, N. Y., a corporation of Maine No Drawing. Application June 22, 1954, Serial No. 438,605

4 Claims. (Cl. 260—33.4)

This invention relates to new and useful compositions of matter and more particularly to compositions comprising an acrylamide polymerization product (that is, a polymer of acrylamide) and at least one hydroxy-containing compound selected from the class consisting of ethylene glycol, propylene glycol, glycerol, glycerol alpha-monochlorohydrin and lactonitrile. More particularly the invention is concerned with such compositions wherein the hydroxy-containing compound is compatible and forms a solution (homogeneous mixture) with the acrylamide polymerization product; or, otherwise stated, the said polymerization product is dissolved in the said hydroxy-containing compound. The aforesaid hydroxy-containing compounds function as a solvent, swelling agent or plasticizer for the acrylamide polymerization product.

The claims of the present application are limited to homopolymeric acrylamide as the acrylamide polymerization product and to ethylene glycol as the hydroxy-containing compound in which the homopolymeric acrylamide is dissolved or with which it is plasticized.

The compositions of this invention in which ethylene glycol is employed primarily as a solvent or swelling agent for the acrylamide polymerization product, in which case it constitutes a major proportion (more than 50%), e. g., from 55 to 99% or more, by weight of the composition, are particularly useful in the production of shaped articles therefrom, e. g., filaments, films, threads, rods, tubes and the like, or as coating, adhesive, laminating, impregnating, paper-treating, textile-treating compositions, etc., or as components of such compositions. A hydroxy-containing compound of the kind aforementioned also may be used primarily as a plasticizer for an acrylamide polymerization product, in which case it usually constitutes a minor proportion (less than 50%), e. g., from 0.5 to 45%, generally from 1 to 35 or 40%, by weight of the composition. If the product is used or intended for use in an application where water-insolubility is important, it can be rendered water-insoluble by suitable treatment or modification, as by cross-linking with a cross-linking agent, e. g., methylene-bis-acrylamide, diallyl phthalate, etc.

Polymers and copolymers of acrylamide were known prior to our invention. Likewise it was known that homopolymeric acrylamide and many of the copolymers of acrylamide are soluble in water. However, to the best of our knowledge and belief it was not known prior to our invention that acrylamide polymerization products could be dissolved or swollen in certain organic solvents. Thus, in a recent article by Shulz et al., "Studies on the Radical Polymerization of Acrylamide" [Makromol. Chem. 12, 20–34 (1954)], the authors state: "The polyacrylamides prepared by the polymerization methods that we have described . . . are soluble in water, but insoluble in ordinary solvents such as alcohols, esters, ethers, and hydrocarbons." Among the organic compounds specifically mentioned by the authors as being non-solvents for polyacrylamide are tetrahydrofuran, dimethylformamide, nitrobenzene, bromobenzene, and tetralin.

The present invention is based on our discovery that polymers and copolymers of acrylamide, more particularly polymeric (homopolymeric) acrylamide and thermoplastic copolymers of acrylamide, specifically such copolymers containing in their molecules an average of at least 75% by weight of combined acrylamide, e. g., copolymers of, by weight, from 75 to 99.5% of acrylamide and another monomer such, for instance, as vinyl acetate, methyl acrylate, ethyl acrylate, acrylic acid, etc., are compatible with ethylene glycol, propylene glycol, glycerol, glycerol alpha-monochlorohydrin, and lactonitrile, and with mixtures thereof in any proportions, and that such hydroxy-containing compounds are capable of dissolving or swelling the acrylamide polymerization product to yield solutions or swollen masses which are suitable for use in a wide variety of industrial applications, examples of which have been given hereinbefore. The invention is based on our further discovery that the aforementioned hydroxy compound or mixtures thereof are able effectively to plasticize acrylamide polymerization products so that the latter more easily can be shaped, as by extrusion or molding, or cast into useful articles of manufacture. The hydroxy compound employed in practicing our invention may be used either as a temporary modifier (more particularly, as a temporary plasticizer), that is, a modifier which subsequently is removed from the polymerization product, or as a permanent modifier, specifically plasticizer, which is permitted to remain in the acrylamide homopolymer or copolymer.

The unobvious nature of our invention will be immediately apparent to those skilled in the art when it is considered that polyacrylamide does not dissolve upon being admixed with any of a large number of organic compounds, even when heated at 120° C. for ½ hour or when heated to boiling and then at boiling for about 10 minutes in the case of those compounds boiling under 120° C. Thus we have found that finely ground polyacrylamide does not dissolve, swell, or coalesce, when heated under the aforementioned conditions, in each of the following compounds:

Isoamyl alcohol
Diethylene glycol monoethyl ether
Cresol
Diethylene glycol
Cyclohexanol
Tetrahydrofurfuryl alcohol
Ethylene glycol monoethyl ether
Monoethylene glycol monoethyl formal
Acetonitrile
Trichloroacetonitrile
Acrylonitrile
Succinonitrile
Dimethylformamide
Dimethylcyanamide
Diethylthiophosphonamide
Triethanolamine
Triethylenetetramine
Acetic anhydride
Maleic anhydride
Methacrylic acid
Butyrolactone
Pyrrolidone
2-methyldioxolane
Dioxane
Sulfolane
Nitroethane
Ethylene carbonate
Ethylene sulfite
Diallyl carbamate
Triallyl cyanurate
β-Cyanoethyl acetate
Dibutyl phthalate Triethyl phosphate
Trimethyl orthoformate
Ethylene chlorohydrin
Epichlorohydrin
Diacetyl
Tetrahydrofuran
Pentaerythritol dipropional
Chloromaleic anhydride
Methyl ethyl ketone Homopolymeric acrylamide and acrylamide copolymers (thermoplastic acrylamide copolymers) containing in the polymer molecules an average of at least 75% by weight of combined acrylamide are employed in carrying the present invention into effect. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which are polymerized. The proportions of monomers in the polymerizable mixture therefore are preferably adjusted, in practicing the present invention, so that the final copolymer contains in the molecules thereof an average of at least 75% by weight of combined acrylamide. The acrylamide polymerization product may be one in which, for example, a homopolymer of acrylamide has been modified by introducing one or more other groups into the polymer molecule. For example, the acrylamide polymerization product may be one in which homopolymeric acrylamide or certain copolymers of acrylamide have been hydrolyzed under acid or alkaline conditions to introduce carboxylic acid or salt groups into the polymer molecule or structure, or has been reacted with an aldehyde, specifically formaldehyde, to introduce alkylol, more particularly methylol, groups into the polymer structure. In such instances, the extent of hydrolysis or alkylolation or other modification is so controlled that the acrylamide polymerization product still contains at least 75% by weight of acrylamide units. The expression "polymerization product containing in the polymer molecules an average of at least 75% by weight of combined acrylamide," as used herein and in the appended claims, means therefore, a polymerization product (polymer, copolymer or interpolymer, graft polymer, or polymer modified by the introduction of other groups, etc., or mixtures thereof) containing in the molecules thereof an average of at least 75% by weight of the acrylamide unit, which is considered to be present in the individual polymer molecule as the group

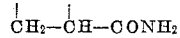

or, otherwise stated, at least 75% by weight of the reactant substance converted into and forming or comprising the polymerization product is acrylamide.

Illustrative examples of monomers which may be copolymerized with acrylamide to yield a polymerization product containing in the polymer molecules an average of at least 75% by weight of combined acrylamide are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids other than acrylamide (e. g., methyl, ethyl, propyl, butyl, etc., acrylates and methacrylates, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylamide to yield thermoplastic copolymers. Alpha,beta-unsaturated polycarboxylic acids and alkyl esters thereof also may be copolymerized with acrylamide to form copolymers which are useful in practicing the present invention, e. g., maleic, fumaric, citraconic, itaconic, etc., acids, and the dimethyl, -ethyl, -propyl, -butyl, etc., esters thereof.

The polymeric and copolymeric acrylamides used in practicing our invention may be of any suitable molecular weight, but ordinarily the molecular weight (weight average molecular weight) is not less than 10,000 and may be as high as 2 million or more. Ordinarily the weight average molecular weight is within the range of about 70,000 or 80,000 to 1,600,000–2,000,000. Such molecular weight (weight average molecular weights) are determined in the manner described more fully by P. Flory, "Principles of Polymer Chemistry," Cornell University Press, 1953, chap. 7, p. 266 et seq. Briefly described the values are ascertained by calculating intrinsic viscosities (limiting viscosity numbers) from measurements of flow times in an Ostwald viscosimeter at 30.0° C. of any four concentrations of the acrylamide polymerization product below 0.5 g./100 ml. in water or 1 N sodium nitrate solution. The relation between the "intrinsic viscosity" and the weight average molecular weight is previously established by light-scattering measurements on a set of eight samples of pure polyacrylamide, in water, ranging in weight average molecular weight from 78,700 to 1,640,000. The light-scattering measurements are performed on solutions filtered through ultrafine sintered glass and are interpreted by standard light-scattering procedures and corrected by determination of dissymmetries and depolarization ratios.

The dissolution of the acrylamide polymerization product in, or swelling by, the hydroxy compound employed in practicing the present invention is accelerated by using a polymer or copolymer of acrylamide which is in a finely divided state, e. g., one which, if not in a finely divided state as originally formed, has been ground so that all or substantially all of it will pass through a U. S. standard sieve series No. 50 screen. It also is usually desirable to agitate the mass, as by mechanical stirring, while admixing the polymerization product with the solvent. To avoid or minimize discoloration of the polymeric or copolymeric acrylamide, it is generally advantageous to employ the lowest possible temperature in effecting dissolution, swelling, or plasticization of the acrylamide polymerization product, which temperature is consistent with practical considerations, e. g., the time required for effecting solution (or other desired result), etc.

The proportions of the acrylamide polymerization product and the hydroxy compound in the compositions of our invention may be varied widely, depending mainly upon the particular use for which the composition is intended. If the hydroxy compound is employed primarily as a solvent for the acrylamide homopolymer or copolymer so as to obtain, for example, a film or other shaped article, or to make a coating, impregnating, laminating, adhesive, textile-treating composition, etc., from which all or substantially all of the solvent subsequently is removed, then the acrylamide polymerization product usually constitutes at least 1%, but less than 50%, e. g., from 5% to about 25 or 30%, by weight of the composition. Advantageously, in most cases, when the solution is to be used in, for example, the casting of films, the polymer or copolymer of acrylamide constitutes at least 5% by weight of the solution.

The solutions of the acrylamide polymerization product in ethylene glycol, glycerol, or glycerol alpha-monochlorohydrin are especially adapted for casting in the form of films. For instance, the hot, liquid composition may be cast upon a revolving drum which is partly immersed in a coagulating bath of, for example, acetone, methyl ethyl ketone or dioxane, and which will serve to deposit the polymerization product as a thin film on the drum as it passes through the bath.

If the hydroxy compound is to be employed primarily as a plasticizer for the acrylamide polymerization product, then the said compound generally constitutes less than 50%, e. g., from 1% to 35 or 40%, by weight of the composition (hydroxy compound plus polymer or copolymer of acrylamide).

The aforementioned ranges of proportions are mentioned as indicative of proportions that may be employed in forming solutions of, or plasticized compositions containing, the acrylamide polymerization product, and our invention obviously is not limited to the use of only such proportions. The important factor is that the proportions be such that the viscosity or plasticity of the composition at the particular operating temperature (that is, the temperature at which the composition is employed) be within a workable range for the particular use to which the composition is to be placed.

In order that those skilled in the art may better understand how the present invention can be carried into effect, the following examples are given by way of illustration and not by way of limitation. All parts and percentages are by weight unless otherwise stated.

*Example 1*

One (1) part of dry homopolymeric acrylamide, ground so that substantially all of it passes through a U. S. standard sieve series No. 50 screen, is thoroughly mixed with 99 parts of ethylene glycol. (The polyacrylamide employed has a weight average molecular weight of about 200,000 as determined by the method hereinbefore described, that is, by viscometric data related to previous light-scattering measurements.) The mixture is allowed to stand at room temperature (about 20°–30° C.) for 3 days, at the end of which period of time a slight tendency of the solid polyacrylamide to dissolve is evident. Heating of the mass at 85° C. for about 5 minutes causes swelling of the solid material. After standing for several weeks more at room temperature, followed by heating at 120° C. for 30 minutes, the polyacrylamide completely dissolves in the ethylene glycol to form a clear, homogeneous solution. This solution can be cast to yield films as hereinbefore described. Films of plasticized homopolymeric acrylamide are obtained by allowing a suitable amount of ethylene glycol to remain in the film, e. g., from 1 or 2% to 35 or 40% or more by weight of the film.

If water-resistant films are desired, they can be obtained by immersing the film (before or after removal of all or part of the ethylene glycol) in an aqueous solution to form the N-methylol derivative of the polyacrylamide, followed by heating at 120°–150° C. to obtain a water-insoluble, cross-linked material.

*Example 2*

Same as in Example 1 with the exception that there is employed a dry, finely divided copolymer of about 75% acrylamide and 25% of (*a*) vinyl acetate, or (*b*) methyl acrylate, or (*c*) styrene, or (*d*) methacrylonitrile, or (*e*) methacrylamide. Similar results are obtained.

*Example 3*

Same as in Example 1 with the exception that 99 parts of glycerol is used instead of 99 parts of ethylene glycol. Similar results are obtained.

*Example 4*

One (1) part of finely ground homopolymeric acrylamide, such as was employed in Example 1, and 99 parts of glycerol alphamonochlorohydrin (3-chloro-1,2-propanediol) are mixed thoroughly together and heated at 120° C. for 30 minutes. At the end of this period of time the polyacrylamide is visibly swollen. After standing for several weeks at room temperature, the polyacrylamide has still not completely dissolved, but dissolves completely upon again heating at 120° C. for a few minutes.

*Example 5*

Same as in Example 4 with the exception that there is employed a dry, finely divided copolymer of about 75% acrylamide and 25% of (*a*) vinyl acetate, or (*b*) methyl acrylate, or (*c*) styrene, or (*d*) methacrylonitrile, or (*e*) methacrylamide. Similar results are obtained.

*Example 6*

One (1) gram of finely ground homopolymeric acrylamide, such as was employed in Example 1, is added to 100 ml. of a 50/50 mixture, by volume, of formamide and ethylene glycol. The mixture is heated at 120° C. for 30 minutes, yielding a swollen mass of polyacrylamide. A clear, homogeneous solution of the polyacrylamide in the above solvent mixture is obtained by allowing the mass to stand for about two weeks at room temperature.

*Example 7*

Same as in Example 6 with the exception that there is used 100 ml. of a 50/50 mixture, by volume, of formamide and glycerol. Similar results are obtained.

*Example 8*

One (1) gram of a dry, ground copolymer of about 90% acrylamide and 10% acrylic acid is added to 100 ml. of ethylene glycol. The resulting mixture is heated at 120° C. for 30 minutes, yielding a swollen acrylamide-acrylic acid copolymer. When the swollen mass is allowed to remain in the excess ethylene glycol for one week at room temperature (20°–30° C.), a clear, homogeneous solution is obtained.

*Example 9*

Same as in Example 8 with the exception that 100 ml. of glycerol is employed instead of 100 ml. of ethylene glycol. Similar results are obtained.

*Example 10*

A mixture of 99 parts of lactonitrile and 1 part of finely ground homopolymeric acrylamide, such as was employed in Example 1, is heated to 120° C. for 30 minutes, after which it is allowed to stand at room temperature for three weeks. During this time the solid homopolymer of acrylamide swells to form a translucent, swollen mass which does not further dissolve upon standing for an additional period of time.

*Example 11*

Same as in Example 10 with the exception that 99 parts of propylene glycol is used instead of 99 parts of lactonitrile. Similar results are obtained.

It will be understood, of course, by those skilled in the art that our invention is not limited to the specific ingredients and method of effecting solution of the polymer or copolymer of acrylamide that are given by way of illustration in the foregoing examples. Thus, instead of the specific comonomers employed in Examples 2, 5 and 8 in forming copolymers with acrylamide, we may use any other comonomer which is copolymerizable with acrylamide in the proportions hereinbefore set forth, that is, in proportions such that the finished copolymer contains in the molecules thereof at least 75% by weight of combined acrylamide. Numerous examples of such comonomers were given previously in the specification.

The advantages of the present invention will be immediately apparent to those skilled in the art from the foregoing description. The invention broadens the field of utility of polyacrylamide, since it provides solvents and plasticizers therefor, other than water, and thus makes the resulting compositions suitable in applications for which aqueous solutions of polyacrylamide would be entirely unsuited. As is well known, aqueous solutions of polyacrylamide are polar and have a high dielectric constant; consequently such solutions are entirely unsuitable for many applications.

As a result of the present invention all of the inherent advantages of a non-aqueous solvent or swelling agent can be utilized in working with polyacrylamide (homopolymeric acrylamide) and with copolymers of acrylamide containing at least about 75% of acrylamide combined in the polymer molecule. For instance, the invention provides compositions which can be extruded or otherwise shaped to form useful articles of manufacture. The compositions of the present invention are also useful in warp-sizing and other textile-treating applications, as well as in adhesive compositions, ceramic binders, nitrocellulose lacquers, as components of rubber-based glues, in furniture glues which are capable of withstanding freeze-thaw cycles, in making chemical analyses of polymers and copolymers of acrylamide where it is desired to make the analysis in a non-aqueous solvent for the acrylamide polymerization product, and for various other purposes, many examples of which have been given hereinbefore.

We claim:

1. A composition of matter comprising homopolymeric acrylamide dissolved in ethylene glycol.

2. A composition as in claim 1 wherein the homopolymeric acrylamide constitutes at least 1% by weight of the composition.

3. A composition of matter comprising (1) homopolymeric acrylamide and (2) a solvent and plasticizer for the said homopolymeric acrylamide of (1) comprising ethylene glycol, the said homopolymeric acrylamide of (1) constituting from about 1% to about 30%, by weight, of the total amount of (1) and (2).

4. A plasticized composition comprising homopolymeric acrylamide plasticized with a plasticizing amount not substantially exceeding 40% by weight of the composition of a plasticizer comprising ethylene glycol.

References Cited in the file of this patent

UNITED STATES PATENTS

| | | |
|---|---|---|
| 2,132,671 | Bauer | Oct. 11, 1938 |
| 2,173,005 | Strain | Sept. 12, 1939 |
| 2,620,324 | Coover et al. | Dec. 2, 1952 |